United States Patent
Gyoda (10) Patent No.: US 11,307,394 B2
(45) Date of Patent: Apr. 19, 2022

(54) OPTICAL SYSTEM AND IMAGE PICKUP APPARATUS

(71) Applicant: CANON KABUSHIKI KAISHA, Tokyo (JP)

(72) Inventor: Yuichi Gyoda, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 344 days.

(21) Appl. No.: 16/393,826

(22) Filed: Apr. 24, 2019

(65) Prior Publication Data

US 2019/0339497 A1    Nov. 7, 2019

(30) Foreign Application Priority Data

May 1, 2018 (JP) .............................. JP2018-088066

(51) Int. Cl.
G02B 15/167    (2006.01)
G02B 13/00     (2006.01)

(52) U.S. Cl.
CPC ......... *G02B 15/167* (2013.01); *G02B 13/009* (2013.01); *G02B 13/0045* (2013.01)

(58) Field of Classification Search
CPC .. G02B 15/24; G02B 15/167; G02B 15/1421; G02B 15/14411; G02B 13/009; G02B 13/22; G02B 13/0045
See application file for complete search history.

(56) References Cited

U.S. PATENT DOCUMENTS

| 9,500,842 B2* | 11/2016 | Nakahara ........... G02B 27/0025 |
| 9,541,746 B2* | 1/2017 | Yokoyama .............. G02B 7/10 |
| 2005/0063072 A1 | 3/2005 | Harada |
| 2017/0090150 A1* | 3/2017 | Naruse .............. G02B 27/0025 |

FOREIGN PATENT DOCUMENTS

JP      2017-223754 A     12/2017

* cited by examiner

*Primary Examiner* — Alicia M Harrington
(74) *Attorney, Agent, or Firm* — Canon U.S.A., Inc. IP Division (57) ABSTRACT

Provided is an optical system including, in order from an object side to an image side: a first lens unit having a positive refractive power; a first focus lens unit having a positive refractive power and configured to move toward the object side for focusing from infinity to a closest object distance; and a second focus lens unit having a negative refractive power and configured to move toward the image side during focusing from infinity to the closest object distance, and an interval between each pair of adjacent lens units is changed during focusing. Further, a focal length of the first focus lens unit, a movement amount of the first focus lens unit during focusing from infinity to the closest object distance, a focal length of the optical system, and a total lens length of the optical system are each appropriately set.

19 Claims, 9 Drawing Sheets

OPTICAL SYSTEM AND IMAGE PICKUP APPARATUS

BACKGROUND OF THE INVENTION

Field of the Invention

The aspect of the embodiments relates to an optical system and an image pickup apparatus including the same, and is suitable as an image pickup optical system for a digital still camera, a digital video camera, a TV camera, or a monitoring camera, for example.

Description of the Related Art

In the related art, there is known a macro lens as an image pickup optical system that is used in an image pickup apparatus to mainly photograph a close distance object at a photographing magnification of about an equal magnification. A macro lens is designed such that photography can be satisfactorily performed from an object at infinity to a close distance object at a photographing magnification of about 1× or 0.5×. With the macro lens, when the photographing magnification range is further increased, variations in various aberrations accompanying focusing become noticeable.

To address this situation, there is known an image pickup optical system adopting a so-called floating system, in which a plurality of lens units are moved independently during focusing in order to reduce aberration variations during focusing on the close distance object.

An image pickup optical system described in U.S. Patent Application Publication No. 2005/0063072 consists of, in order from an object side to an image side, a first lens unit having a positive refractive power, a second lens unit having a negative refractive power, a third lens unit having a positive refractive power, and a fourth lens unit having a positive or negative refractive power. Further, during focusing from infinity to a close object distance, the second lens unit is moved toward the image side, and the third lens unit is moved toward the object side.

An image pickup optical system described in Japanese Patent Application Laid-Open No. 2017-223754 consists of, in order from an object side to an image side, a first lens unit having a positive refractive power, a second lens unit having a positive refractive power, a third lens unit having a negative refractive power, and a fourth lens unit having a positive refractive power. Further, during focusing from infinity to a closest object distance, the second lens unit is moved toward the object side, and the third lens unit is moved toward the image side.

With the use of the floating system in which two lens units are moved in order to reduce the aberration variations during focusing, it becomes easy to reduce the aberration variations for photography from infinity to a close object distance. The floating system is very effective in reducing the aberration variations particularly in close-up photography. However, in order to reduce the aberration variations during focusing and obtain high optical performance over the entire object distance from infinity to proximity distance with the use of the floating system while downsizing and reducing the weight of the image pickup optical system, it is important to appropriately set configurations of the image pickup optical system.

For example, it is important to appropriately set lens units to be moved, movement amounts of the lens units to be moved, and other such configurations. When those configurations are not appropriately set, it becomes difficult to reduce the variations in various aberrations accompanying focusing while downsizing and reducing the weight of the image pickup optical system, and it becomes very difficult to obtain high optical performance over the entire object distance.

SUMMARY OF THE INVENTION

There is provided an optical system including, in order from an object side to an image side: a first lens unit having a positive refractive power; a first focus lens unit having a positive refractive power, which is configured to move toward the object side during focusing from infinity to a closest object distance; and a second focus lens unit having a negative refractive power, which is configured to move toward the image side during focusing from infinity to the closest object distance, the first lens unit, the first focus lens unit, and the second focus lens unit having an interval between each pair of adjacent lens units changed during focusing, wherein the following conditional expressions are satisfied:

$$-5.00 < DA/fA < -0.18; \text{ and}$$

$$D/f < 1.00,$$

where fA is a focal length of the first focus lens unit, DA is a movement amount of the first focus lens unit during focusing from infinity to the closest object distance, "f" is a focal length of the optical system, and D is a total lens length of the optical system.

Further features of the disclosure will become apparent from the following description of exemplary embodiments with reference to the attached drawings.

DESCRIPTION OF THE EMBODIMENTS

Now, exemplary embodiments of the disclosure are described with reference to the accompanying drawings. An optical system according to an exemplary embodiment of the disclosure consists of, in order from an object side to an image side, a first lens unit having a positive refractive power, and a rear group including a plurality of lens units. Further, the rear group includes a lens unit A having a positive refractive power, which is arranged closest to the object side in the rear group, and is configured to move toward the object side during focusing from infinity to a closest object distance, and a lens unit B having a negative refractive power, which is configured to move toward the image side during focusing from infinity to the closest object distance.

Figure 1:
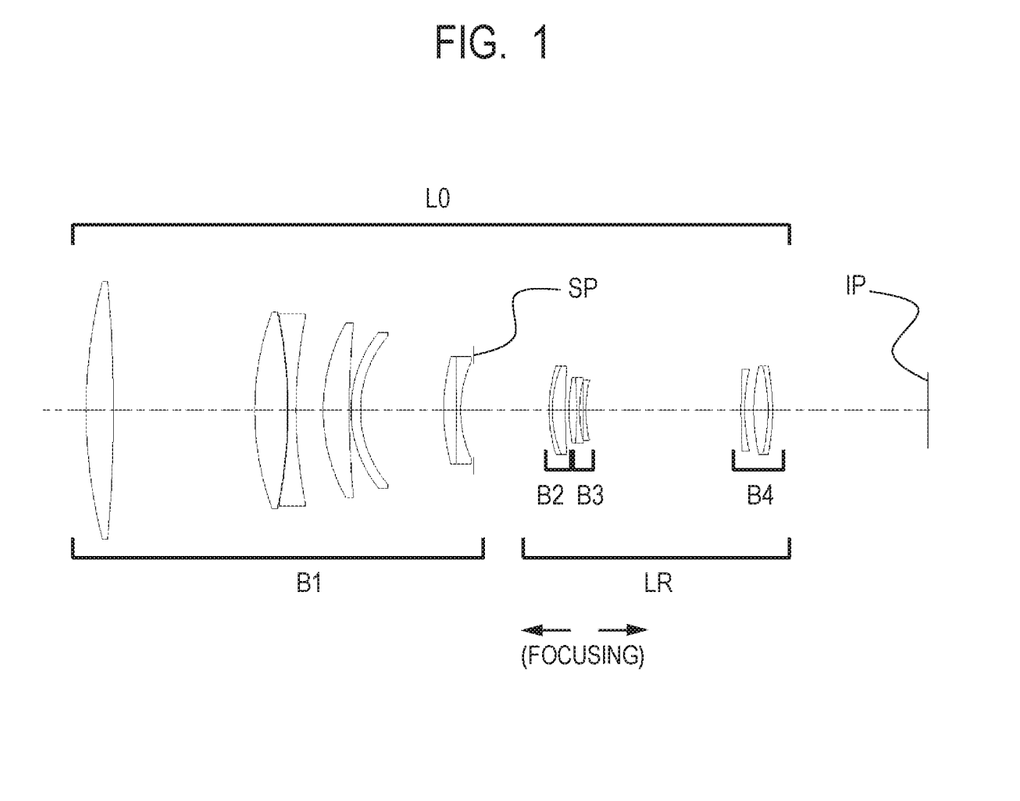
FIG. 1 is a cross-sectional view of an optical system according to Embodiment 1 of the disclosure when the optical system is focused at infinity.
Figure 2A:
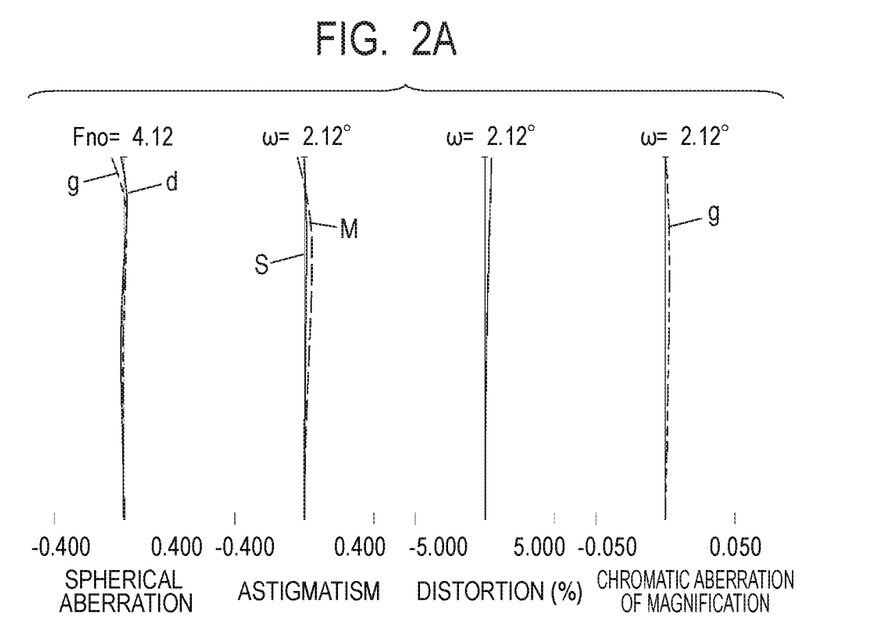
FIG. 2A is a longitudinal aberration diagram of the optical system according to Embodiment 1 when the optical system is focused at infinity.
Figure 2B:
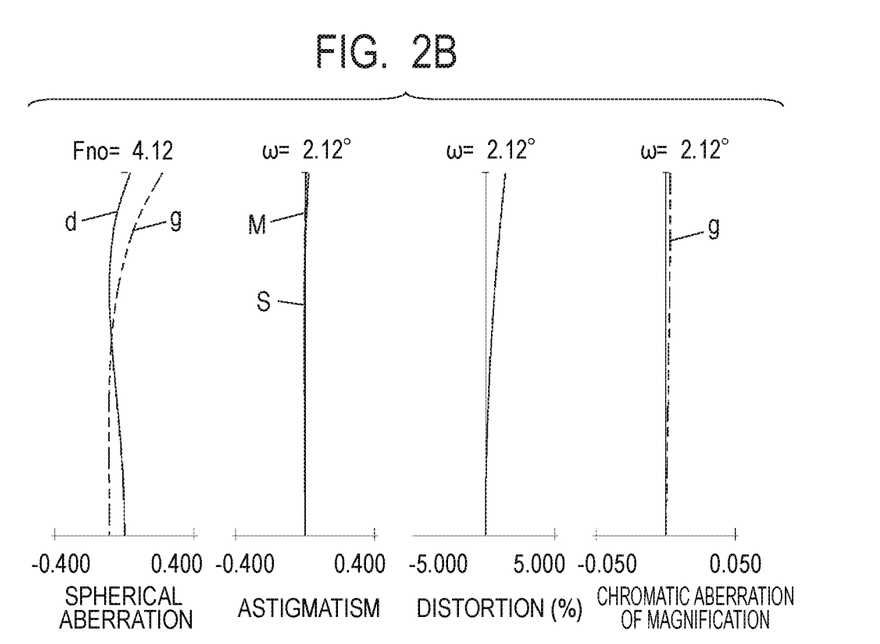
FIG. 2B is a longitudinal aberration diagram of the optical system according to Embodiment 1 when the optical system is focused at a closest object distance.

FIG. 1 is a lens cross-sectional view of an optical system according to Embodiment 1 of the disclosure when the optical system is focused at infinity. FIG. 2A and FIG. 2B are longitudinal aberration diagrams of Embodiment 1 when the optical system is focused at infinity and at the closest object distance (lateral magnification $\beta=-0.70$), respectively.

Figure 3:
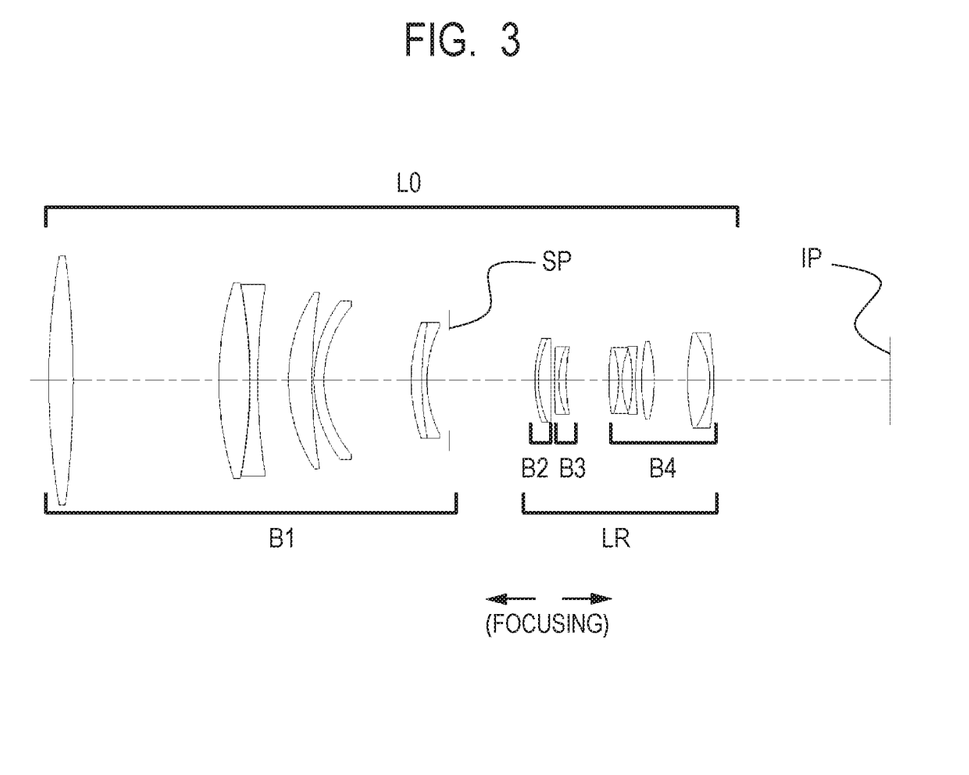
FIG. 3 is a cross-sectional view of an optical system according to Embodiment 2 of the disclosure when the optical system is focused at infinity.
Figure 4A:
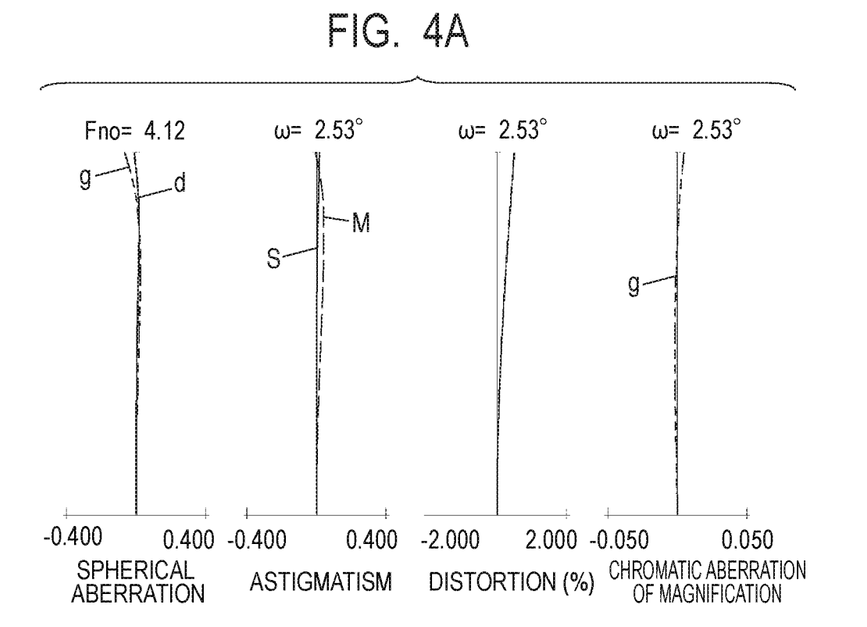
FIG. 4A is a longitudinal aberration diagram of the optical system according to Embodiment 2 when the optical system is focused at infinity.
Figure 4B:
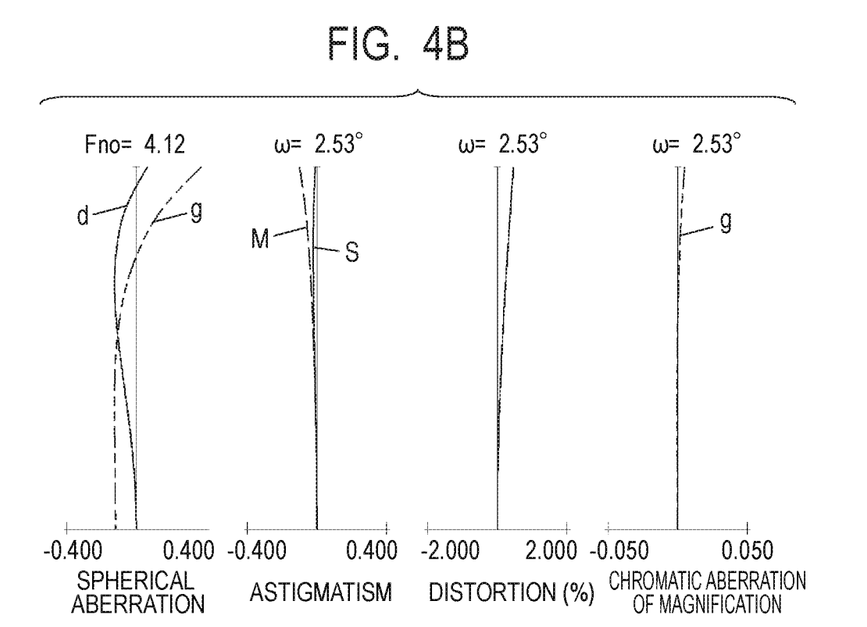
FIG. 4B is a longitudinal aberration diagram of the optical system according to Embodiment 2 when the optical system is focused at the closest object distance.

FIG. 3 is a lens cross-sectional view of an optical system according to Embodiment 2 of the disclosure when the optical system is focused at infinity. FIG. 4A and FIG. 4B are longitudinal aberration diagrams of Embodiment 2 when the optical system is focused at infinity and at the closest object distance (lateral magnification $\beta=-0.57$), respectively.

Figure 5:
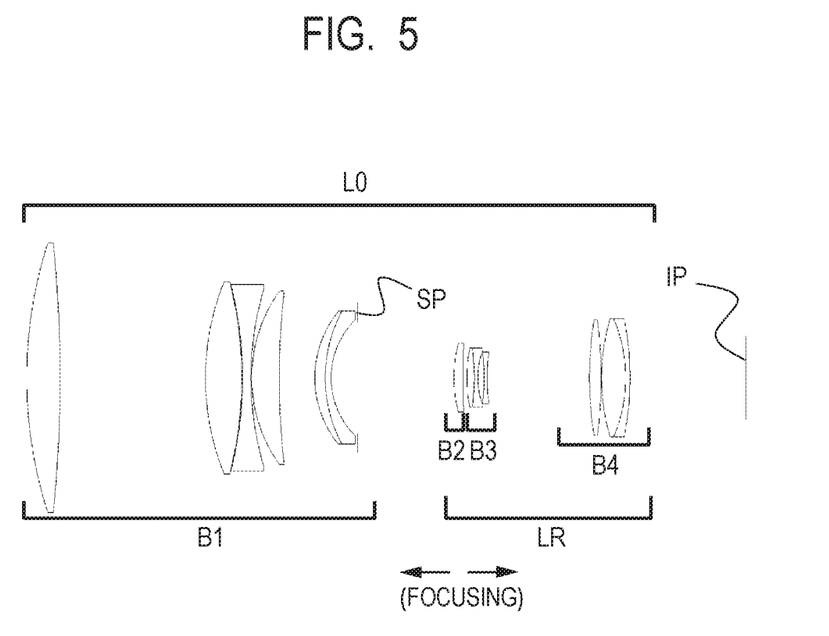
FIG. 5 is a cross-sectional view of an optical system according to Embodiment 3 of the disclosure when the optical system is focused at infinity.
Figure 6A:
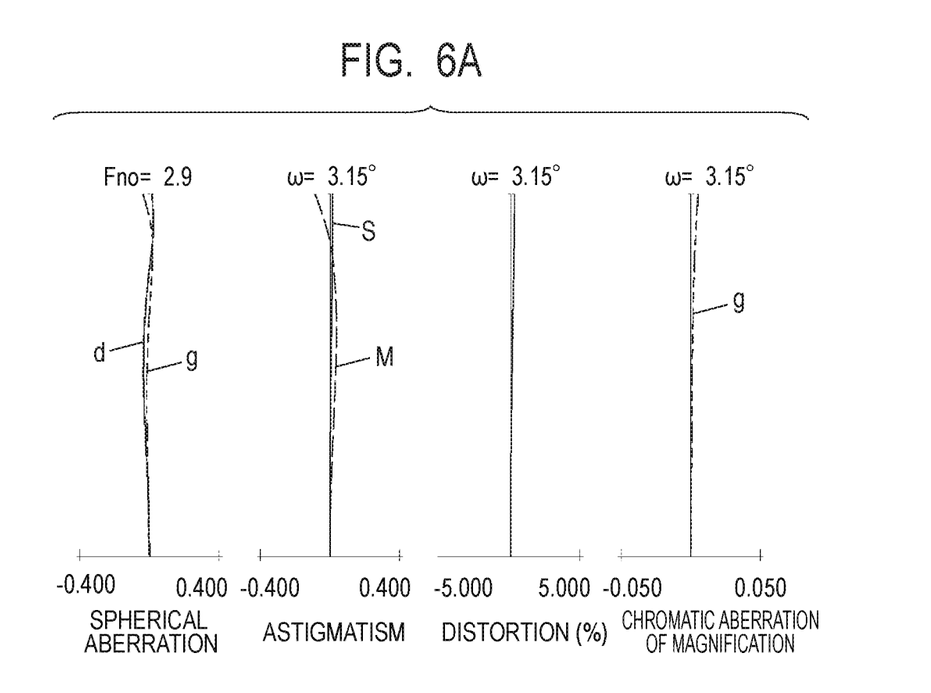
FIG. 6A is a longitudinal aberration diagram of the optical system according to Embodiment 3 when the optical system is focused at infinity.
Figure 6B:
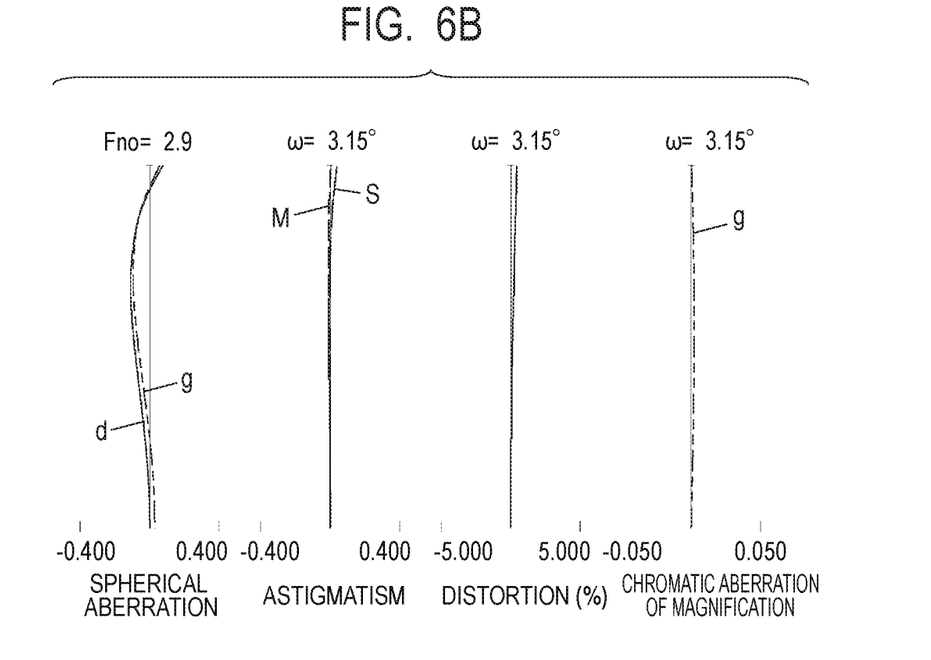
FIG. 6B is a longitudinal aberration diagram of the optical system according to Embodiment 3 when the optical system is focused at the closest object distance.

FIG. 5 is a lens cross-sectional view of an optical system according to Embodiment 3 of the disclosure when the optical system is focused at infinity. FIG. 6A and FIG. 6B are longitudinal aberration diagrams of Embodiment 3 when the optical system is focused at infinity and at the closest object distance (lateral magnification $\beta=-0.53$), respectively.

Figure 7:
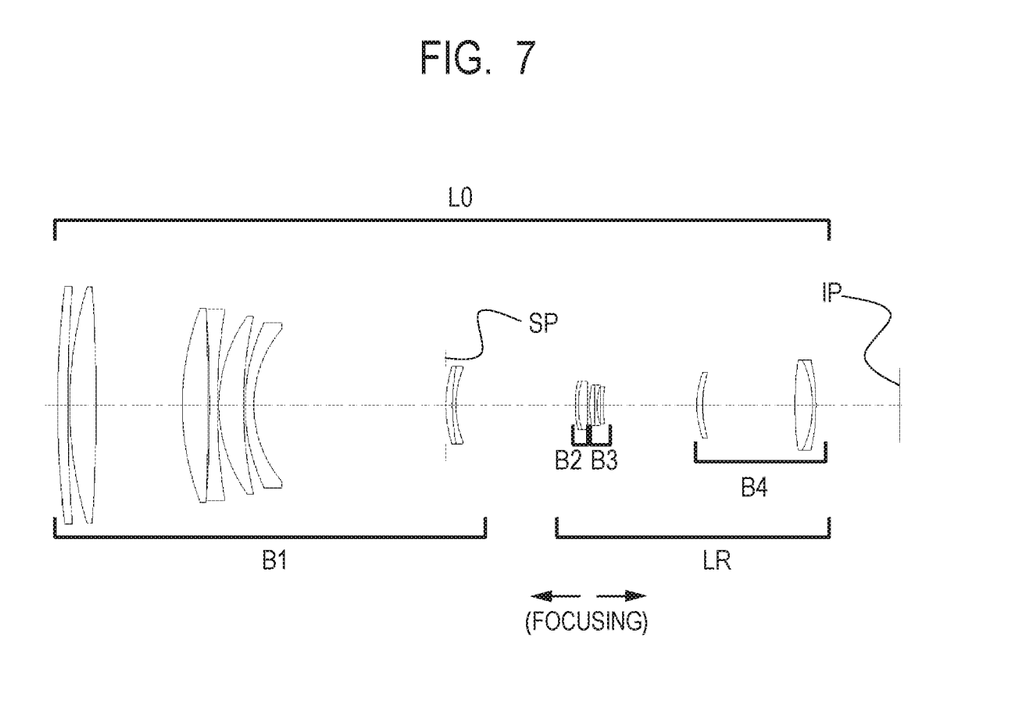
FIG. 7 is a cross-sectional view of an optical system according to Embodiment 4 of the disclosure when the optical system is focused at infinity.
Figure 8A:
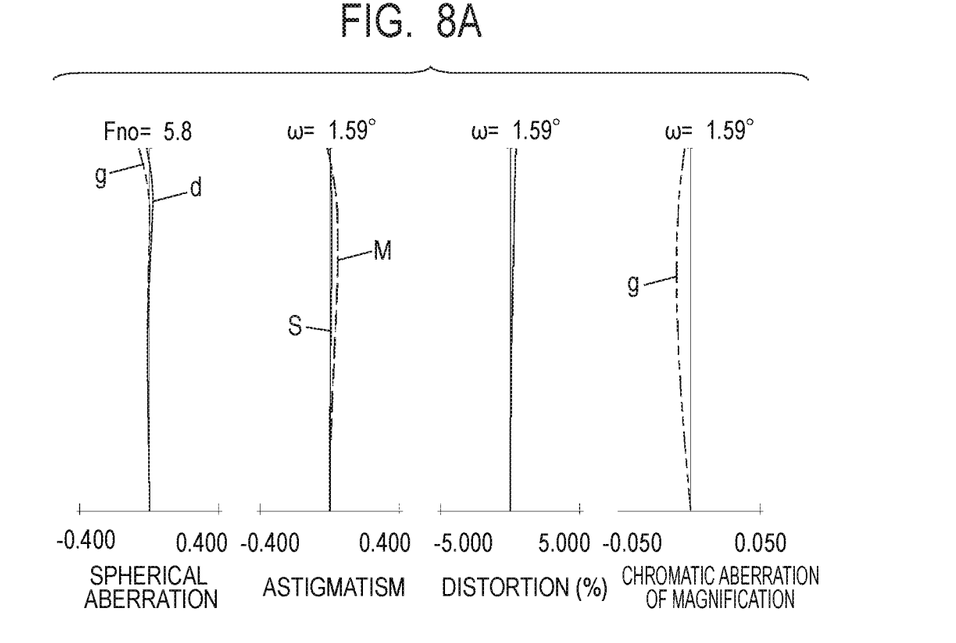
FIG. 8A is a longitudinal aberration diagram of the optical system according to Embodiment 4 when the optical system is focused at infinity.
Figure 8B:
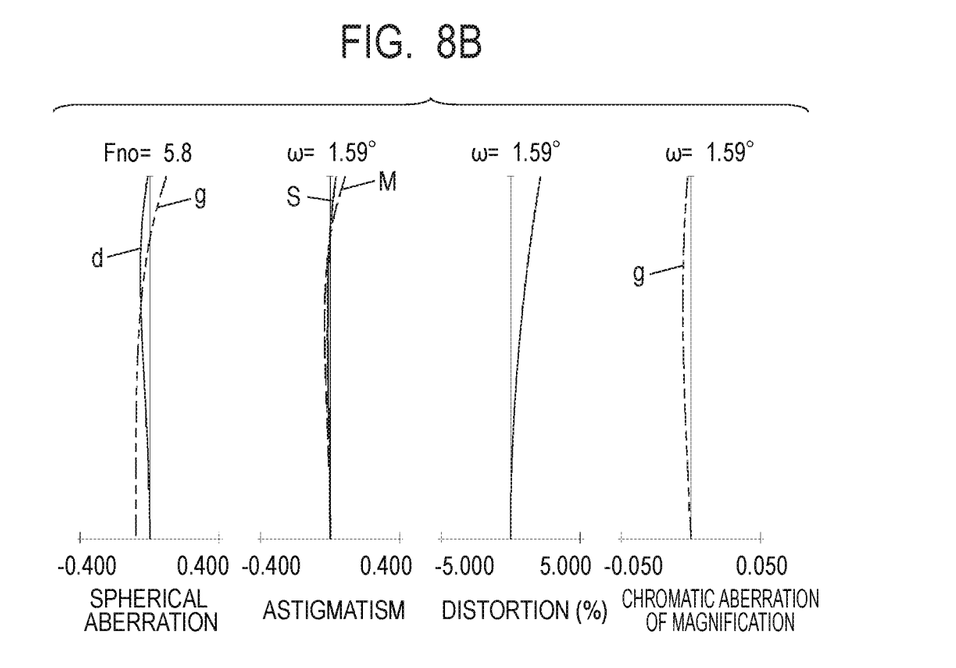
FIG. 8B is a longitudinal aberration diagram of the optical system according to Embodiment 4 when the optical system is focused at the closest object distance.

FIG. 7 is a lens cross-sectional view of an optical system according to Embodiment 4 of the disclosure when the optical system is focused at infinity. FIG. 8A and FIG. 8B are longitudinal aberration diagrams of Embodiment 4 when the optical system is focused at infinity and at the closest object distance (lateral magnification $\beta=-1.00$), respectively.

Figure 9:
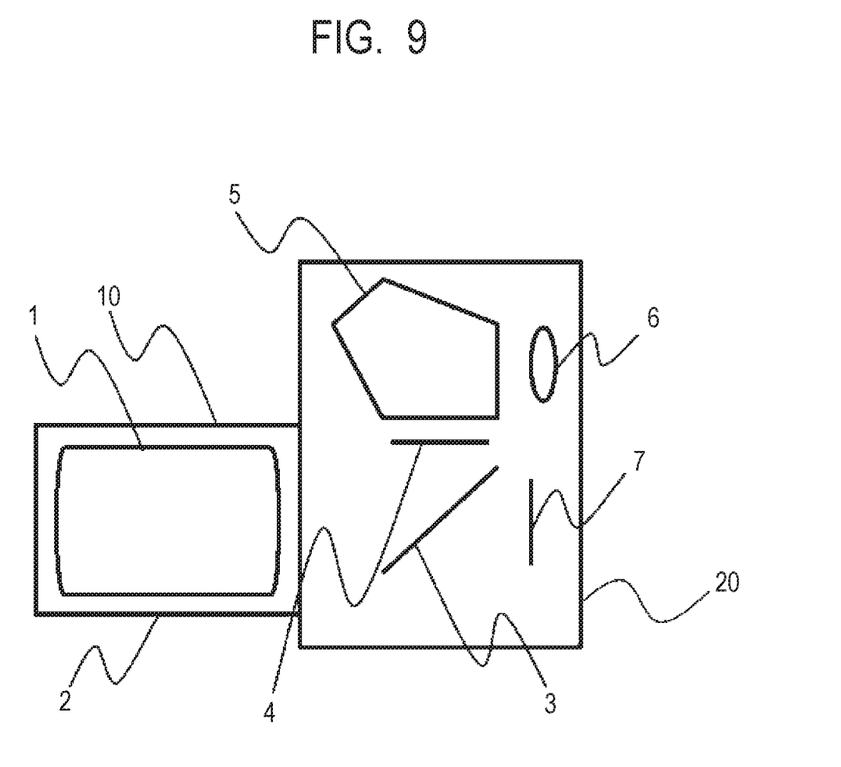
FIG. 9 is a schematic diagram of a main part of an image pickup apparatus according to an exemplary embodiment of the disclosure.

FIG. 9 is a schematic diagram of a main part of an image pickup apparatus according to an exemplary embodiment of the disclosure.

The optical system according to each of Embodiments is an image pickup optical system used with an image pickup apparatus, for example, a video camera, a digital still camera, a TV camera, or a monitoring camera. The optical system according to each of Embodiments may also be used as a projection optical system for a projection apparatus (projector). In the lens cross-sectional views, the left side is the object side (front side), and the right side is the image side (rear side).

In the lens cross-sectional views, an optical system L0 consists of a first lens unit B1 having a positive refractive power, and a rear group LR including a plurality of lens units. The rear group LR consists of a second lens unit B2 having a positive refractive power, a third lens unit B3 having a negative refractive power, and a fourth lens unit B4 having a positive refractive power. During focusing from infinity to the closest object distance, the second lens unit B2 is configured to move toward the object side, and the third lens unit B3 is configured to move toward the image side. The second lens unit B2 corresponds to the lens unit A (first focus lens unit), and the third lens unit B3 corresponds to the lens unit B (second focus lens unit). The term "lens unit" as used herein includes a case in which the lens unit consists of one lens, and a case in which the lens unit consists of a plurality of lenses.

An aperture stop SP is configured to determine (restrict) a ray at an open F-number (Fno). An image plane IP corresponds to an image pickup plane of a solid-state image pickup element (photo-electric conversion element) such as a CCD sensor or a CMOS sensor when the optical system according to one embodiment of the disclosure is used as a photographing optical system of a video camera or a digital still camera. The arrows regarding focusing indicate directions of movements of the lens units during focusing from infinity to the closest object distance.

In the aberration diagrams, an F-number is represented by Fno, and a half angle of view (degrees) is represented by "ω", and is an angle of view expressed as a ray tracing value. In spherical aberration diagrams, a d-line (wavelength: 587.6 nm) is represented by a solid line "d", and a g-line (wavelength: 435.8 nm) is represented by a two-dot chain line "g". In astigmatism diagrams, a sagittal image plane of the d-line is represented by a solid line S, and a meridional image plane of the d-line is represented by a dotted line M. Distortion is shown for the d-line. In diagrams of chromatic aberration of magnification, a g-line is represented by a two-dot chain line "g".

In the optical system L0 according to an embodiment of the disclosure, the second lens unit B2 (lens unit A) (first focus lens unit) and the third lens unit B3 (lens unit B) (second focus lens unit) in the rear group LR are used for focusing. During focusing from infinity to the closest object distance, the second lens unit B2 is configured to move toward the object side, and the third lens unit B3 is configured to move toward the image side. During focusing from infinity to the closest object distance, both of the second lens unit B2 and the third lens unit B3 are moved in a direction of increasing a photographing magnification. Therefore, (an absolute value of) the photographing magnification for the closest object distance is increased by moving both of the second lens unit B2 and the third lens unit B3.

In general, in telephoto type optical systems, a lens close to the object side is large in effective diameter of the lens, and is heavy in weight. When such a heavy lens unit is to be moved during focusing, a holding mechanism configured to hold the lens unit and a drive mechanism configured to move the lens unit are also increased in size and weight. Therefore, a configuration in which the focus lens units are arranged in the rear group LR is adopted to downsize and reduce the weight of the optical system.

Moreover, an axial ray and a pupil paraxial ray pass through the rear group LR of the telephoto type optical systems at low positions from an optical axis. Therefore, the lens units in the rear group LR are used as the focus lens units to suppress variations in various aberrations, such as spherical aberration, axial chromatic aberration, and chromatic aberration of magnification during focusing.

In each of Embodiments, the focus lens units are arranged in the rear group LR to easily achieve high image quality not only when the optical system is focused at infinity but also when the optical system is focused at the closest object distance.

In each of Embodiments, a focal length of the second lens unit B2 (lens unit A) is represented by fA, a movement amount of the second lens unit B2 (lens unit A) during focusing from infinity to the closest object distance is represented by DA, a focal length of the optical system L0 is represented by "f", and a total lens length of the optical system L0 is represented by D. At this time, the following conditional expressions are satisfied.

$$-5.00 < DA/fA < -0.18 \quad (1)$$

$$D/f < 1.00 \quad (2)$$

In the expression, the movement amount DA is a physical quantity having a sign. The movement amount DA has a positive sign when the second lens unit B2 is moved toward the image side during focusing from infinity to the closest object distance.

Moreover, the total lens length D is a length obtained by adding a back focus to a distance on the optical axis from the frontmost lens surface (first lens surface) to the final lens surface of the optical system. A back focus BF is a length obtained by expressing the distance from the final lens surface to the image plane in air-equivalent length.

Next, technical meanings of the above-mentioned conditional expressions are described. The conditional expression (1) relates to a ratio of the movement amount of the second lens unit B2 (lens unit A) during focusing to the focal length of the second lens unit B2. When the positive refractive power of the second lens unit B2 becomes too small (that is, the positive refractive power becomes too weak), and the ratio of the conditional expression (1) exceeds the upper limit of the conditional expression (1), the movement amount of the second lens unit B2 during focusing is increased, and the total lens length is disadvantageously increased. In contrast, when the positive refractive power of the second lens unit B2 becomes too large, and the ratio of the conditional expression (1) falls below the lower limit of the conditional expression (1), the total lens length is easily reduced, but variations in spherical aberration and axial chromatic aberration become larger during focusing, with the result that it becomes difficult to maintain high optical performance.

The conditional expression (2) relates to a ratio of the total lens length of the optical system L0 to the focal length of the optical system L0. When the total lens length becomes too long, and the ratio of the conditional expression (2) exceeds the upper limit of the conditional expression (2), high image quality is easily achieved, but it becomes difficult to downsize and reduce the weight of the optical system L0. Therefore, through satisfaction of the conditional expressions (1) and (2), there can be obtained the optical system, which facilitates close-up photography, and with which it is easy to downsize and reduce the weight of the optical system L0 while achieving high image quality.

In each of Embodiments, at least one of the following conditional expressions is satisfied. A focal length of the third lens unit (lens unit B) is represented by fB, and a movement amount of the third lens unit (lens unit B) during focusing from infinity to the closest object distance is represented by DB. A focal length of the first lens unit B1 is represented by f1. An imaging magnification of the optical system L0 at a time when the optical system L0 is focused at the closest object distance is represented by "β". At this time, at least one of the following conditional expressions is satisfied.

$$-5.00 < DB/fB < -0.05 \quad (3)$$

$$0.50 < |f1|/f < 1.20 \quad (4)$$

$$|\beta| > 0.3 \quad (5)$$

Next, technical meanings of the above-mentioned conditional expressions are described. The conditional expression (3) relates to a ratio of the movement amount of the third lens unit B3 (lens unit B) during focusing to the focal length of the third lens unit B3. When the negative refractive power of the third lens unit B3 becomes too small (that is, an absolute value of the negative refractive power becomes too small), and the ratio of the conditional expression (3) exceeds the upper limit of the conditional expression (3), the movement amount of the third lens unit B3 is increased, and the total lens length is disadvantageously increased.

In contrast, when the negative refractive power of the third lens unit B3 becomes too large (that is, the absolute value of the negative refractive power becomes too large), and the ratio of the conditional expression (3) falls below the lower limit of the conditional expression (3), the total lens length is easily reduced. However, variations in spherical aberration and axial chromatic aberration become larger during focusing, with the result that it becomes difficult to maintain high optical performance.

The conditional expression (4) relates to a ratio of the focal length of the first lens unit B1 to the focal length of the optical system L0. When the positive refractive power of the first lens unit B1 becomes too small (weak), and the ratio of the conditional expression (4) exceeds the upper limit of the conditional expression (4), the refractive powers of the lenses become weaker, and the various aberrations generated by the lens surfaces become smaller. Therefore, high image quality is easily achieved, but it becomes difficult to downsize and reduce the weight of the optical system L0. In contrast, when the positive refractive power of the first lens unit B1 becomes too large (strong), and the ratio of the conditional expression (4) falls below the lower limit of the conditional expression (4), it becomes easy to downsize and reduce the weight of the optical system L0. However, large amounts of spherical aberration and axial chromatic aberration are generated by the lens surfaces in the first lens unit B1, and hence it becomes difficult to achieve high image quality.

In the conditional expression (5), the imaging magnification when the optical system is focused at the closest object distance is defined. When the imaging magnification falls below the lower limit value of the conditional expression (5), the effects as a macro lens are disadvantageously reduced.

With the above-mentioned configurations, there can be obtained the optical system that facilitates close-up photography and achieves high image quality, downsizing, and a reduced weight. Furthermore, in one embodiment, the numerical ranges of the conditional expressions (1) to (5) are set as follows.

$$-2.500 < DA/fA < -0.185 \quad (1a)$$

$$D/f < 0.97 \quad (2a)$$

$$-2.50 < DB/fB < -0.10 \quad (3a)$$

$$0.55 < |f1|/f < 1.10 \quad (4a)$$

$$|\beta| > 0.4 \quad (5a)$$

Furthermore, in one embodiment, the numerical ranges of the conditional expressions (1a) to (5a) are set as follows.

$$-1.50 < DA/fA < -0.19 \quad (1b)$$

$$D/f < 0.95 \quad (2b)$$

$$-1.50 < DB/fB < -0.15 \quad (3b)$$

$$0.60 < f1/f < 1.00 \quad (4b)$$

$$|\beta| > 0.5 \quad (5b)$$

In each of Embodiments, the following configurations are adopted. In the optical system L0 according to each of Embodiments, the first lens unit B1 includes a plurality of lenses, and to include a lens G1 (first positive lens), which is arranged closest to the object side, and a positive lens G2 (second positive lens), which is arranged adjacent to, and on the image side of, the lens G1. With the lens G1 being a positive lens, a ray can be converged toward the lens G2, and it becomes easy to downsize and reduce the weight of the lens G2.

Similarly, with the lens G2 being a positive lens, a ray can be converged toward the third lens G3 counted from the object side, and it becomes easy to downsize and reduce the weight of the lens G3. In many of the telephoto type optical systems, the weight of a lens arranged on the object side occupies most of the weight of the entire optical system. Therefore, through downsizing and reducing the weights of the lens G2 and the lens G3, it becomes easy to downsize and reduce the weight of the optical system L0.

Moreover, in one embodiment, the second lens unit B2 for focusing includes at least one positive lens and at least one negative lens. With this configuration, a variation in chromatic aberration during focusing can be reduced, and it becomes easy to maintain high image quality over the entire object distance from infinity to the closest object distance.

Similarly, in one embodiment, the third lens unit B3 for focusing includes at least one positive lens and at least one negative lens. With this configuration, a variation in chromatic aberration during focusing can be reduced, and it becomes easy to maintain high image quality over the entire object distance from infinity to the closest object distance.

Moreover, in the optical system according to each of Embodiments, an aperture stop SP is arranged between the first lens unit B1 and the second lens unit B2. The aperture stop SP is a member configured to determine (restrict) a ray at the open f-number (Fno), and can adjust an amount of light that passes through the optical system L0 by changing an aperture diameter by a mechanical or electrical method. Moreover, with an off-axial ray passing through the center of the optical axis of the aperture stop SP, the off-axial ray can pass through the optical system L0 regardless of the diameter of the aperture stop SP.

In each of Embodiments, the first lens unit B1 is configured not to move during focusing. In each of Embodiments, the rear group LR consists of, in order from the object side to the image side, the second lens unit B2 (lens unit A), the third lens unit B3 (lens unit B), and the fourth lens unit B4 having the positive refractive power, which is configured not to move during focusing.

In each of Embodiments 1, 2, and 4, the second lens unit B2 (lens unit A) consists of a cemented lens formed by cementing a negative lens and a positive lens. In Embodiment 3, the second lens unit B2 (lens unit A) consists of one positive lens. In each of Embodiments 1, 3, and 4, the third lens unit B3 (lens unit B) consists of, in order from the object side to the image side, a cemented lens formed by cementing a positive lens and a negative lens, and a negative lens. In Embodiment 2, the third lens unit B3 (lens unit B) consists of a cemented lens formed by cementing a negative lens and a positive lens.

An image pickup apparatus according to an exemplary embodiment of the disclosure is described with reference to FIG. 9. In FIG. 9, there is illustrated an image pickup optical system 10 including an optical system 1 according to any one of Embodiments 1 to 4.

The optical system 1 is held by a lens barrel 2 serving as a holding member. A camera main body 20 includes a quick return mirror 3, a focusing plate 4, a penta dach prism 5, an eyepiece 6, and other components. The quick return mirror 3 reflects a ray from the optical system 1 upward. The focusing plate 4 is arranged at an image forming position of the optical system 1. The penta dach prism 5 converts a reverse image formed on the focusing plate 4 into an erect image. An observer observes the erect image through the eyepiece 6. An image pickup element 7 is configured to receive the image formed by the optical system 1.

The exemplary embodiments of the disclosure are described above, but the disclosure is not limited to those embodiments, and can be modified and changed variously within the scope of the gist thereof. For example, the optical system according to each of Embodiments does not include an image stabilization lens unit. However, the optical system may include an image stabilization lens in the rear group LR, for example. Moreover, the optical system may include not only a spherical lens but also an aspherical lens. Further, the optical system may include not only a refracting optical element (so-called "lens") but also a diffractive optical element.

Now, Numerical Embodiments 1 to 4 respectively corresponding to Embodiments 1 to 4 are described. In each of Numerical Embodiments, a surface number counted from the object side is represented by "i". A curvature radius of the i-th surface in order from the object side is represented by "ri", a lens thickness or an air interval between the i-th surface and the (i+1)-th surface in order from the object side is represented by "di", and a refractive index and an Abbe number of a material of an optical member between the i-th surface and the (i+1)-th surface in order from the object side are represented by "ni" and "vi", respectively. When the interval is variable, the interval is expressed as a value at a time when an object distance (image pickup magnification) (lateral magnification) is changed.

A "half angle of view" indicates an image pickup half angle of view expressed as a ray tracing value. BF represents a back focus. A total lens length is a distance from the first lens surface to the image plane at a time when the optical system is focused on an object at infinity. Moreover, relationships between the above-mentioned conditional expressions and Embodiments 1 to 4 are shown in Table 1.

[Numerical Embodiment 1]

Surface data

| Surface number | r | d | nd | vd | Effective diameter |
|---|---|---|---|---|---|
| 1 | 295.870 | 15.32 | 1.53172 | 48.8 | 141.99 |
| 2 | −820.777 | 80.00 | | | 141.37 |
| 3 | 162.650 | 18.67 | 1.43387 | 95.1 | 108.19 |
| 4 | −267.983 | 0.30 | | | 106.30 |
| 5 | −274.338 | 4.45 | 1.73800 | 32.3 | 105.86 |
| 6 | 265.772 | 15.34 | | | 101.44 |

[Numerical Embodiment 1]

| | | | | | |
|---|---|---|---|---|---|
| 7 | 101.909 | 14.70 | 1.43387 | 95.1 | 95.96 |
| 8 | 502.413 | 1.00 | | | 93.61 |
| 9 | 70.098 | 5.30 | 1.61340 | 44.3 | 85.40 |
| 10 | 64.206 | 47.22 | | | 80.68 |
| 11 | 117.719 | 7.15 | 1.89286 | 20.4 | 59.37 |
| 12 | −1,287.475 | 2.40 | 1.90366 | 31.3 | 57.71 |
| 13 | 66.627 | 7.54 | | | 53.18 |
| 14 (Stop) | ∞ | (Variable) | | | 52.63 |
| 15 | 81.657 | 1.90 | 1.85478 | 24.8 | 48.73 |
| 16 | 64.825 | 7.48 | 1.72916 | 54.7 | 48.02 |
| 17 | 459.450 | (Variable) | | | 47.27 |
| 18 | 99.099 | 4.26 | 1.74077 | 27.8 | 35.79 |
| 19 | −252.439 | 1.62 | 1.83481 | 42.7 | 34.80 |
| 20 | 71.825 | 2.04 | | | 32.92 |
| 21 | 1,875.835 | 1.57 | 1.72916 | 54.7 | 32.84 |
| 22 | 71.309 | (Variable) | | | 31.98 |
| 23 | 503.096 | 2.00 | 1.80810 | 22.8 | 44.94 |
| 24 | 105.318 | 5.17 | | | 45.33 |
| 25 | 111.733 | 8.06 | 1.73800 | 32.3 | 48.37 |
| 26 | −104.506 | 2.50 | 1.92286 | 18.9 | 48.67 |
| 27 | −128.715 | 87.97 | | | 49.13 |
| Image plane | ∞ | | | | |

Various data

| | |
|---|---|
| Focal length | 584.99 |
| F-number | 4.12 |
| Half angle of view (degrees) | 2.12 |
| Image height | 21.64 |
| Total lens length | 476.28 |
| BF | 87.97 |

Lens unit interval data

| | | |
|---|---|---|
| Lateral magnification | 0.00 | −0.70 |
| d14 | 42.45 | 14.73 |
| d17 | 2.00 | 97.75 |
| d22 | 87.86 | 19.83 |

Lens unit data

| Unit | First surface | Focal length |
|---|---|---|
| 1 | 1 | 520.82 |
| 2 | 15 | 142.05 |
| 3 | 18 | −71.72 |
| 4 | 23 | 158.77 |

Single lens data

| Lens | First surface | Focal length |
|---|---|---|
| 1 | 1 | 410.96 |
| 2 | 3 | 236.39 |
| 3 | 5 | −182.28 |
| 4 | 7 | 291.41 |
| 5 | 9 | −1,892.16 |
| 6 | 11 | 121.09 |
| 7 | 12 | −70.04 |
| 8 | 15 | −388.12 |
| 9 | 16 | 102.69 |
| 10 | 18 | 96.56 |
| 11 | 19 | −66.83 |
| 12 | 21 | −101.70 |
| 13 | 23 | −165.21 |
| 14 | 25 | 74.35 |
| 15 | 26 | −633.49 |

[Numerical Embodiment 2]

Surface data

| Surface number | r | d | nd | vd | Effective diameter |
|---|---|---|---|---|---|
| 1 | 361.237 | 11.98 | 1.53172 | 48.8 | 118.70 |
| 2 | −478.352 | 71.15 | | | 118.31 |
| 3 | 161.758 | 15.00 | 1.43387 | 95.1 | 92.60 |
| 4 | −253.462 | 0.30 | | | 90.96 |
| 5 | −241.916 | 3.70 | 1.73800 | 32.3 | 90.88 |
| 6 | 290.010 | 15.00 | | | 88.04 |
| 7 | 79.837 | 11.49 | 1.43387 | 95.1 | 83.19 |
| 8 | 252.638 | 1.00 | | | 81.63 |
| 9 | 65.134 | 4.90 | 1.73800 | 32.3 | 75.97 |
| 10 | 55.888 | 42.63 | | | 71.03 |
| 11 | 83.643 | 5.16 | 1.80810 | 22.8 | 55.33 |
| 12 | 151.357 | 2.50 | 1.74320 | 49.3 | 53.72 |
| 13 | 58.796 | 10.68 | | | 50.43 |
| 14 (Stop) | ∞ | (Variable) | | | 48.90 |
| 15 | 65.625 | 1.80 | 1.85478 | 24.8 | 39.86 |
| 16 | 50.380 | 5.86 | 1.59522 | 67.7 | 38.97 |
| 17 | 3,014.152 | (Variable) | | | 38.45 |
| 18 | 284.209 | 2.00 | 1.88300 | 40.8 | 31.74 |
| 19 | 39.900 | 3.65 | 1.59270 | 35.3 | 30.09 |
| 20 | 88.228 | (Variable) | | | 29.53 |
| 21 | 126.917 | 4.71 | 1.85478 | 24.8 | 31.11 |
| 22 | −54.977 | 1.61 | 1.65160 | 58.5 | 31.02 |
| 23 | 40.679 | 5.12 | | | 30.08 |
| 24 | −59.231 | 1.50 | 1.83400 | 37.2 | 30.17 |
| 25 | 139.826 | 2.99 | | | 31.92 |
| 26 | 94.214 | 6.17 | 1.61340 | 44.3 | 35.93 |
| 27 | −73.087 | 16.19 | | | 36.80 |
| 28 | 104.598 | 10.98 | 1.67300 | 38.1 | 44.28 |
| 29 | −42.140 | 1.80 | 1.80810 | 22.8 | 44.35 |
| 30 | −154.278 | 86.24 | | | 45.13 |
| Image plane | ∞ | | | | |

Various data

| | |
|---|---|
| Focal length | 489.05 |
| F-number | 4.12 |
| Half angle of view (degrees) | 2.53 |
| Image height | 21.64 |
| Total lens length | 411.08 |
| BF | 86.24 |

Lens unit interval data

| | | |
|---|---|---|
| Lateral magnification | 0.00 | −0.57 |
| d14 | 42.04 | 2.00 |
| d17 | 2.00 | 60.97 |
| d20 | 20.93 | 2.00 |

Lens unit data

| Unit | First surface | Focal length | Lens unit structure length | Front principal point position | Rear principal point position |
|---|---|---|---|---|---|
| 1 | 1 | 381.35 | 195.49 | −154.98 | −225.10 |
| 2 | 15 | 129.05 | 7.66 | −0.76 | −5.39 |
| 3 | 18 | −91.71 | 5.65 | 2.79 | −0.57 |
| 4 | 21 | 396.78 | 51.08 | 123.03 | 120.47 |

Single lens data

| Lens | First surface | Focal length |
|---|---|---|
| 1 | 1 | 389.00 |
| 2 | 3 | 230.10 |
| 3 | 5 | −178.19 |
| 4 | 7 | 263.72 |
| 5 | 9 | −688.31 |
| 6 | 11 | 223.75 |
| 7 | 12 | −130.87 |
| 8 | 15 | −268.31 |
| 9 | 16 | 86.02 |
| 10 | 18 | −52.77 |

[Numerical Embodiment 2]

| | | |
|---|---|---|
| 11 | 19 | 119.54 |
| 12 | 21 | 45.42 |
| 13 | 22 | −35.64 |
| 14 | 24 | −49.72 |
| 15 | 26 | 68.05 |
| 16 | 28 | 46.02 |
| 17 | 29 | −72.26 |

[Numerical Embodiment 3]

Surface data

| Surface number | r | d | nd | vd | Effective diameter |
|---|---|---|---|---|---|
| 1 | 228.353 | 17.18 | 1.53172 | 48.8 | 135.37 |
| 2 | −690.036 | 75.00 | | | 134.59 |
| 3 | 132.954 | 18.75 | 1.43387 | 95.1 | 96.00 |
| 4 | −198.648 | 0.41 | | | 93.75 |
| 5 | −194.953 | 4.30 | 1.73800 | 32.3 | 93.35 |
| 6 | 159.944 | 0.40 | | | 87.88 |
| 7 | 76.884 | 14.26 | 1.43387 | 95.1 | 86.57 |
| 8 | 395.372 | 18.31 | | | 84.94 |
| 9 | 54.395 | 5.42 | 1.92286 | 18.9 | 67.16 |
| 10 | 72.984 | 3.00 | 1.85478 | 24.8 | 65.50 |
| 11 | 42.257 | 13.64 | | | 58.25 |
| 12 (Stop) | ∞ | (Variable) | | | 57.31 |
| 13 | 69.803 | 4.76 | 1.59522 | 67.7 | 34.15 |
| 14 | 629.692 | (Variable) | | | 33.33 |
| 15 | 84.829 | 3.80 | 1.84666 | 23.8 | 29.23 |
| 16 | −99.602 | 1.71 | 1.83400 | 37.2 | 28.37 |
| 17 | 39.209 | 3.21 | | | 25.59 |
| 18 | −125.839 | 1.63 | 1.88300 | 40.8 | 25.39 |
| 19 | 85.402 | (Variable) | | | 24.92 |
| 20 | 196.775 | 5.98 | 1.61340 | 44.3 | 57.61 |
| 21 | −232.744 | 0.20 | | | 58.13 |
| 22 | 108.072 | 12.43 | 1.61340 | 44.3 | 59.71 |
| 23 | −78.068 | 2.20 | 1.80810 | 22.8 | 59.56 |
| 24 | −157.126 | 59.99 | | | 59.72 |
| Image plane | ∞ | | | | |

Various data

| | |
|---|---|
| Focal length | 392.56 |
| F-number | 2.90 |
| Half angle of view (degrees) | 3.15 |
| Image height | 21.64 |
| Total lens length | 371.16 |
| BF | 59.99 |

Lens unit interval data

| | | |
|---|---|---|
| Lateral magnification | 0.00 | −0.53 |
| d12 | 49.72 | 4.00 |
| d14 | 2.00 | 56.87 |
| d19 | 52.89 | 43.75 |

Lens unit data

| Unit | First surface | Focal length | Lens unit structure length | Front principal point position | Rear principal point position |
|---|---|---|---|---|---|
| 1 | 1 | 288.57 | 170.66 | −81.13 | −167.76 |
| 2 | 13 | 131.48 | 4.76 | −0.37 | −3.34 |
| 3 | 15 | −35.58 | 10.35 | 6.56 | −0.68 |
| 4 | 20 | 73.24 | 20.80 | 5.00 | −8.13 |

[Numerical Embodiment 3]

Single lens data

| Lens | First surface | Focal length |
|---|---|---|
| 1 | 1 | 324.79 |
| 2 | 3 | 186.77 |
| 3 | 5 | −118.44 |
| 4 | 7 | 217.04 |
| 5 | 9 | 203.03 |
| 6 | 10 | −122.95 |
| 7 | 13 | 131.48 |
| 8 | 15 | 54.63 |
| 9 | 16 | −33.55 |
| 10 | 18 | −57.41 |
| 11 | 20 | 174.75 |
| 12 | 22 | 75.82 |
| 13 | 23 | −194.42 |

[Numerical Embodiment 4]

Surface data

| Surface number | r | d | nd | vd | Effective diameter |
|---|---|---|---|---|---|
| 1 | 580.000 | 6.00 | 1.51633 | 64.1 | 134.21 |
| 2 | 1,000.000 | 1.00 | | | 133.87 |
| 3 | 239.250 | 15.38 | 1.43387 | 95.1 | 133.45 |
| 4 | −1,020.527 | 50.00 | | | 132.67 |
| 5 | 158.349 | 14.99 | 1.43387 | 95.1 | 110.21 |
| 6 | −1,414.545 | 0.86 | | | 108.29 |
| 7 | −802.141 | 4.45 | 1.80400 | 46.6 | 108.24 |
| 8 | 348.886 | 1.00 | | | 104.89 |
| 9 | 89.605 | 14.20 | 1.49700 | 81.5 | 100.58 |
| 10 | 232.381 | 1.00 | | | 97.97 |
| 11 | 110.039 | 5.00 | 1.65100 | 56.2 | 93.22 |
| 12 | 68.461 | 111.60 | | | 85.24 |
| 13 (Stop) | ∞ | 0.00 | | | 44.88 |
| 14 | 75.237 | 3.71 | 1.68893 | 31.1 | 43.54 |
| 15 | 118.008 | 2.00 | 1.88300 | 40.8 | 42.35 |
| 16 | 55.673 | (Variable) | | | 40.48 |
| 17 | 58.154 | 1.90 | 1.90366 | 31.3 | 27.01 |
| 18 | 53.343 | 5.46 | 1.49700 | 81.5 | 26.66 |
| 19 | −291.570 | (Variable) | | | 26.36 |
| 20 | 57.951 | 2.75 | 1.80810 | 22.8 | 22.52 |
| 21 | 180.260 | 1.62 | 1.77250 | 49.6 | 21.64 |
| 22 | 33.084 | 1.94 | | | 20.33 |
| 23 | −1,220.867 | 1.57 | 1.74100 | 52.6 | 20.24 |
| 24 | 70.625 | (Variable) | | | 20.03 |
| 25 | 56.298 | 3.30 | 1.60562 | 43.7 | 37.31 |
| 26 | 61.864 | 53.61 | | | 37.06 |
| 27 | 181.266 | 10.28 | 1.65412 | 39.7 | 50.41 |
| 28 | −60.671 | 2.00 | 1.80810 | 22.8 | 50.53 |
| 29 | −118.632 | 48.66 | | | 51.07 |
| Image plane | ∞ | | | | |

Various data

| | |
|---|---|
| Focal length | 778.44 |
| F-number | 5.80 |
| Half angle of view (degrees) | 1.59 |
| Image height | 21.64 |
| Total lens length | 489.01 |
| BF | 48.66 |

Lens unit interval data

| | | |
|---|---|---|
| Lateral magnification | 0.00 | −0.53 |
| d16 | 69.27 | 8.17 |
| d19 | 1.00 | 106.56 |
| d24 | 54.46 | 10.00 |

-continued

[Numerical Embodiment 4]

Lens unit data

| Unit | First surface | Focal length | Lens unit structure length | Front principal point position | Rear principal point position |
|---|---|---|---|---|---|
| 1 | 1 | 578.77 | 231.19 | −634.43 | −399.89 |
| 2 | 17 | 103.50 | 7.36 | 0.04 | −4.64 |
| 3 | 20 | −50.47 | 7.88 | 5.91 | 0.41 |
| 4 | 25 | 121.12 | 69.19 | 55.25 | −14.04 |

Single lens data

| Lens | First surface | Focal length |
|---|---|---|
| 1 | 1 | 2,661.61 |
| 2 | 3 | 448.36 |
| 3 | 5 | 329.17 |
| 4 | 7 | −301.89 |
| 5 | 9 | 284.06 |
| 6 | 11 | −292.18 |
| 7 | 14 | 291.01 |
| 8 | 15 | −121.18 |
| 9 | 17 | −878.15 |
| 10 | 18 | 91.21 |
| 11 | 20 | 104.64 |
| 12 | 21 | −52.71 |
| 13 | 23 | −90.05 |
| 14 | 25 | 844.41 |
| 15 | 27 | 70.68 |
| 16 | 28 | −156.07 |

TABLE 1

| Conditional Expression | Numerical Embodiment 1 | Numerical Embodiment 2 | Numerical Embodiment 3 | Numerical Embodiment 4 |
|---|---|---|---|---|
| (1) DA/fA | −0.195 | −0.310 | −0.348 | −0.590 |
| (2) D/f | 0.814 | 0.841 | 0.945 | 0.628 |
| (3) DB/fB | −0.949 | −0.206 | −0.257 | −0.881 |
| (4) f1/f | 0.890 | 0.780 | 0.735 | 0.743 |
| (5) $|\beta|$ | 0.70 | 0.57 | 0.53 | 1.00 |

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-088066, filed May 1, 2018, which is hereby incorporated by reference herein in its entirety.

What is claimed is:

1. An optical system comprising, in order from an object side to an image side:
   a first lens unit having a positive refractive power;
   a first focus lens unit having a positive refractive power and configured to move toward the object side for focusing from infinity to a closest object distance; and
   a second focus lens unit having a negative refractive power and configured to move toward the image side for focusing from infinity to the closest object distance,
   wherein an interval between each pair of adjacent lens units is changed during focusing,
   wherein conditional expressions:

$-5.00 < DA/fA < -0.18;$ $D/f < 1.00,$ and $0.735 \leq f1/f < 1.20,$ are satisfied where fA is a focal length of the first focus lens unit, DA is a movement amount of the first focus lens unit for focusing from infinity to the closest object distance, f is a focal length of the optical system, D is a total lens length of the optical system, and f1 is a focal length of the first lens unit.

2. The optical system according to claim 1, wherein a conditional expression:

$-5.00 < DB/fB < -0.05,$ is satisfied where fB is a focal length of the second focus lens unit, and DB is a movement amount of the second focus lens unit for focusing from infinity to the closest object distance.

3. The optical system according to claim 1, wherein the first lens unit includes a first positive lens arranged closest to the object side in the first lens unit, and a second positive lens arranged on the image side of and adjacent to the first positive lens.

4. The optical system according to claim 1, wherein the second focus lens unit includes a positive lens, and a negative lens.

5. The optical system according to claim 1, wherein the first focus lens unit includes a positive lens, and a negative lens.

6. The optical system according to claim 1, wherein a conditional expression:

$|\beta| > 0.3,$ is satisfied where β is an imaging magnification of the optical system at a time when the optical system is focused on the closest object distance.

7. The optical system according to claim 1, wherein the first lens unit includes an aperture stop arranged closest to the image side in the first lens unit.

8. The optical system according to claim 1, wherein the first lens unit is configured not to move for focusing.

9. The optical system according to claim 1, wherein the optical system consists of the first lens unit, the first focus lens unit, the second focus lens unit, and a lens unit having a positive refractive power and configured not to move for focusing.

10. The optical system according to claim 1, wherein the first focus lens unit consists of a cemented lens formed by cementing a negative lens and a positive lens.

11. The optical system according to claim 1, wherein the first focus lens unit consists of one positive lens.

12. The optical system according to claim 1, wherein the second focus lens unit consists of, in order from the object side to the image side, a cemented lens formed by cementing a positive lens and a negative lens, and a negative lens.

13. The optical system according to claim 1, wherein the second focus lens unit consists of a cemented lens formed by cementing a negative lens and a positive lens.

14. An image pickup apparatus comprising:
   an optical system;
   an image pickup element configured to receive an image formed by the optical system,
   wherein the optical system includes, in order from an object side to an image side:
   a first lens unit having a positive refractive power;

a first focus lens unit having a positive refractive power and configured to move toward the object side for focusing from infinity to a closest object distance; and a second focus lens unit having a negative refractive power and configured to move toward the image side for focusing from infinity to the closest object distance, wherein an interval between each pair of adjacent lens units is changed during focusing, and wherein conditional expressions:

$$-5.00 < DA/fA < -0.18;$$

$$D/f < 1.00, \text{ and}$$

$$0.735 \leq f1/f < 1.20,$$

are satisfied where fA is a focal length of the first focus lens unit, DA is a movement amount of the first focus lens unit for focusing from infinity to the closest object distance, "f" is a focal length of the optical system, D is a total lens length of the optical system, and f1 is a focal length of the first lens unit.

15. The image pickup apparatus according to claim 14, wherein a conditional expression:

$$-5.00 < DB/fB < -0.05,$$

is satisfied where fB is a focal length of the second focus lens unit, and DB is a movement amount of the second focus lens unit for focusing from infinity to the closest object distance.

16. The image pickup apparatus according to claim 14, wherein the first lens unit includes a first positive lens arranged closest to the object side in the first lens unit, and a second positive lens arranged on the image side of and adjacent to the first positive lens.

17. The image pickup apparatus according to claim 14, wherein the second focus lens unit includes a positive lens, and a negative lens.

18. The image pickup apparatus according to claim 14, wherein the first focus lens unit includes a positive lens, and a negative lens.

19. The image pickup apparatus according to claim 14, wherein a conditional expression:

$$|\beta| > 0.3,$$

is satisfied where $\beta$ is an imaging magnification of the optical system at a time when the optical system is focused on the closest object distance.

* * * * *